United States Patent
Kim

(10) Patent No.: US 9,543,869 B2
(45) Date of Patent: Jan. 10, 2017

(54) MOTOR CONTROL APPARATUS, IMAGE FORMING APPARATUS HAVING THE SAME, AND MOTOR CONTROL METHOD

(71) Applicant: Samsung Electronics Co., Ltd., Suwon-si (KR)

(72) Inventor: Hyoung Il Kim, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/068,483

(22) Filed: Oct. 31, 2013

(65) Prior Publication Data
US 2014/0132189 A1  May 15, 2014

(30) Foreign Application Priority Data
Nov. 9, 2012 (KR) .................. 10-2012-0126592

(51) Int. Cl.
| | | |
|---|---|---|
| H03K 5/00 | (2006.01) | |
| H02P 7/00 | (2016.01) | |
| G03G 15/00 | (2006.01) | |
| H02P 6/18 | (2016.01) | |
| H02P 6/08 | (2016.01) | |
| H02P 6/14 | (2016.01) | |
| H02P 6/16 | (2016.01) | |

(52) U.S. Cl.
CPC .............. *H02P 7/00* (2013.01); *G03G 15/55* (2013.01); *H02P 6/08* (2013.01); *H02P 6/14* (2013.01); *H02P 6/142* (2013.01); *H02P 6/16* (2013.01); *H02P 6/182* (2013.01)

(58) Field of Classification Search
CPC ............ H02P 6/142; H02P 6/14; H02P 6/182; H02P 6/16; H02P 6/08
USPC ..................................................... 318/400.13
See application file for complete search history.

(56) References Cited

U.S. PATENT DOCUMENTS

| | | | | |
|---|---|---|---|---|
| 6,483,270 B1* | 11/2002 | Miyazaki et al. | ............ | 318/700 |
| 8,773,726 B2* | 7/2014 | Kim | .............................. | 358/412 |
| 2003/0184243 A1* | 10/2003 | Akatsu | .................. | B60L 15/025 318/8 |
| 2008/0062476 A1* | 3/2008 | Kim | ........................ | G05B 19/19 358/486 |
| 2008/0203957 A1* | 8/2008 | Nozaki | ............... | H02P 29/0005 318/603 |

FOREIGN PATENT DOCUMENTS

| | | |
|---|---|---|
| EP | 1 020 987 A1 | 7/2000 |
| EP | 1 898 285 A2 | 3/2008 |
| EP | 1 898 285 A3 | 11/2011 |
| EP | 2 405 569 A2 | 1/2012 |

OTHER PUBLICATIONS

European Search Report issued on Oct. 11, 2016 in corresponding European Patent Application No. 13 19 0757.

* cited by examiner

*Primary Examiner* — Kawing Chan
*Assistant Examiner* — Bradley Brown
(74) *Attorney, Agent, or Firm* — Staas & Halsey LLP

(57) ABSTRACT

Provided herein are a motor control apparatus, an image forming apparatus, an image forming apparatus including the same, and a motor control method, by which position error of a motor and a control value for compensating for the position error are calculated and reflected in feedback control, thereby quickly removing position error of the motor.

34 Claims, 22 Drawing Sheets

MOTOR CONTROL APPARATUS, IMAGE FORMING APPARATUS HAVING THE SAME, AND MOTOR CONTROL METHOD

CROSS-REFERENCE TO RELATED APPLICATIONS

This application claims the priority benefit of Korean Patent Application No. 10-2012-0126592, filed on Nov. 9, 2012 in the Korean Intellectual Property Office, the disclosure of which is incorporated herein by reference.

BACKGROUND

1. Field

Embodiments relate to a motor control apparatus for controlling a direct current (DC) motor, an image forming apparatus including the same, and a motor control method for controlling the DC motor.

2. Description of the Related Art

A direct current (DC) motor is often used as a motor for driving an electronic product. Recently, a brushless DC (BLDC) motor obtained by improving performance of the DC motor has been developed and put to use.

In order to accurately and efficiently control an electronic product having a DC or BLDC motor, there is a need for feedback control to detect rotation information of the motor, compare the rotation information with a target signal, and re-input, to the motor, a control signal for compensating for a difference between the rotation information and the target signal, that is, errors.

Conventionally, only speed control and phase control are performed to compensate for speed error or phase error of a motor, and control to compensate for position error of the motor is not performed. Thus, when a strong external disturbance is applied to the motor, position error is caused to affect an operation of an electronic product.

In particular, when the motor is used in an image forming apparatus, the position error of the motor affects image quality, leading edge margin, and so on.

SUMMARY

In an aspect of one or more embodiments, there is provided a motor control apparatus, an image forming apparatus including the same, and a motor control method, by which position error of the motor and a control value for compensating for the position error of the motor are calculated and reflected in feedback control during the feedback control of the motor used in an electronic product such as an image forming apparatus or the like, thereby quickly removing position error of the motor.

In an aspect of one or more embodiments, there is provided a motor control apparatus which includes a detector to detect rotation of a motor to output a feedback signal, a measurer to measure position counts by counting rising edges or falling edges of a target signal and the feedback signal using a reference clock signal, and a calculator to calculate position error of the motor from the measured position counts of the target signal and feedback signal and to calculate a control value for compensating for the phase error.

The measurer may further measure speeds of the feedback signal and the target signal applied to the motor using the reference clock signal, and the calculator may calculate speed error of the motor from the measured speeds of the target signal and feedback signal and further calculates a control value for compensating for the speed error.

The measurer may further measure a phase difference between the feedback signal and the target signal applied to the motor using the reference clock signal, and the calculator may further calculate a control value for compensating for the phase difference.

The measurer may count the number of pulses of the reference clock signal for one period of the target signal to measure the speed of the target signal, and count the number of pulses of the reference clock signal for one period of the feedback signal to measure the speed of the feedback signal.

The calculator may calculate speed error of the motor from a difference between the speed of the target signal and the speed of the feedback signal.

The calculator may calculate position count error from a difference between the position count of the target signal and the position count of the feedback signal, and calculates position error of the motor by multiplying the position count error by reference time.

The reference time may correspond to the number of pulses of the reference clock signal, counted for one period of the target signal.

The calculator may include a speed control value calculator to calculate a control value for compensating for the speed error, a phase control value calculator to calculate a control value for compensating for the phase error, and a position control value calculator to calculate a control value for compensating for the position error.

The calculator may include a speed control value calculator to calculate a control value for compensating for the speed error, and a phase/position control value calculator to calculate a control value for compensating for phase/position error obtained by combining the phase error and the position error.

The calculator may perform calculation of the control value according to proportional integral differential (PID) control.

The position control value calculator may reduce a command voltage applied to the motor when a position of the feedback signal is ahead of a position of the target signal, and increase the command voltage applied to the motor when the position of the feedback signal lags behind the position of the target signal.

The phase control value calculator may reduce a command voltage applied to the motor when a phase of the feedback is ahead of a phase of the target signal, and increase the command voltage applied to the motor when the phase of the feedback signal lags behind the phase of the target signal.

The calculator may start calculation at a falling edge of the target signal when the measurer measures a position count at a rising edge of the feedback signal or target signal, and start calculation at a rising edge of the target signal when the measurer measures a position count at a falling edge of the feedback signal or target signal.

The motor may be at least one of a direct current (DC) motor and a brushless DC (BLDC) motor.

In an aspect of one or more embodiments, there is provided an image forming apparatus including a motor and a motor control apparatus to control the motor, wherein the motor control apparatus includes a detector to detect rotation of the motor to output a feedback signal, a measurer to measure position counts by counting rising edges or falling edges of a target signal and the feedback signal using a reference clock signal, and a calculator to calculate position error of the motor from the measured position counts of the target signal and feedback signal and to calculate a control value for compensating for the phase error.

The measurer may further measure speeds of the feedback signal and the target signal applied to the motor using the reference clock signal, and the calculator may calculate speed error of the motor from the measured speeds of the target signal and feedback signal and further calculate a control value for compensating for the speed error.

The measurer may further measure a phase difference between the feedback signal and the target signal applied to the motor using the reference clock signal; and the calculator may further calculate a control value for compensating for the phase difference from the measured speeds of the target signal and feedback signal.

The calculator may include a speed control value calculator to calculate a control value for compensating for the speed error, a phase control value calculator to calculate a control value for compensating for the phase difference, and a position control value calculator to calculate a control value for compensating for the position error.

The calculator may include a speed control value calculator to calculate a control value for compensating for the speed error, and a phase/position control value calculator to calculate a control value for compensating for phase/position error obtained by combining the phase difference and the position error.

In an aspect of one or more embodiments, there is provided a motor control method which includes acquiring a feedback signal containing rotation information of a motor, comparing the feedback signal and a target signal applied to the motor to calculate position error, calculating a control value for compensating for the position error, and controlling the motor according to the calculated control value.

The motor control method may further include comparing the feedback signal and the target signal applied to the motor to calculate speed error and phase error, and calculating a control value for compensating for the speed error and the phase error.

The calculating of the control value for compensating for the position error and the calculating of the control value for compensating for the speed error and the phase error may include calculating the control value for compensating for the speed error, calculating the control value for compensating for the phase error, and calculating the control value for compensating for the position error.

The calculating of the control value for compensating for the position error and the calculating of the control value for compensating for the speed error and the phase error may include calculating the control value for compensating for the speed error, and calculating the control value for compensating for phase/position error obtained by combining the phase error and the position error.

The comparing of the feedback signal and the target signal applied to the motor to calculate speed error may include counting the number of pulses of a reference clock signal for one period of the target signal to measure speed of the target signal, and counting the number of pulses of the reference clock signal for one period of the feedback signal to measure speed of the feedback signal.

The comparing of the feedback signal and the target signal applied to the motor to calculate the speed error may include calculating a difference between the measured speed of the target signal and the measured speed of the feedback signal.

The comparing of the feedback signal and the target signal applied to the motor to calculate the phase error may include counting the number of pulses of a reference clock signal generated between a rising edge or falling edge of the target signal and a rising edge or a falling edge of the feedback signal to measure a phase difference.

The comparing of the feedback signal and the target signal applied to the motor to calculate the phase error may include marking the measured phase difference with a sign according to whether the phase error corresponds to Lag or Lead to calculate position error.

The comparing of the feedback signal and the target signal applied to the motor to calculate the position error may include counting rising edges or falling edges of the target signal and feedback signal to measure a position count of the target signal and a position count of the feedback signal, and calculating position count error from a difference between the position count of the target signal and the position count of the feedback signal.

The comparing of the feedback signal and the target signal applied to the motor to calculate the position error may include calculating the position error of the motor by multiplying the position count error by reference time.

The reference time may correspond to the number of pulses of the reference clock signal, counted for one period of the target signal.

The comparing of the feedback signal and the target signal applied to the motor to calculate the position error may include starting calculation at a falling edge of the target signal when a position count is measured at a rising edge of the feedback signal or target signal, and starting calculation at a rising edge of the target signal when a position count is measured at a falling edge of the feedback signal or target signal.

The calculating of the control value for compensating for the position error and the calculating of the control value for compensating for the speed error and the phase error may include performing calculating according to proportional integral differential (PID) control.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to a motor control apparatus according to embodiments, examples of which are illustrated in the accompanying drawings.

A motor control apparatus according to an embodiment may control various motors used in electronic products, and in particular, control a direct current (DC) motor or a brushless DC (BLDC) motor. With regard to the DC motor, speed thereof may be changed according to a voltage applied to the motor and an average voltage thereof may be controlled by adjusting a pulse width according to pulse width modulation (PWM) control. The BLDC motor is a DC motor having no brush and switches coil polarity using a transistor instead of a mechanical brush. In addition, since the BLDC motor does not have a brush, the BLDC does not spark, does not generate brush noise, and can operate at high speed. However, since the BLDC motor is also classified as a DC motor, the basic motor operation characteristics of the BLDC motor are the same as those of the DC motor, except for the above difference. Hereinafter, for convenience of description, the BLDC motor and the DC motor will be referred to as a motor.

Figure 1:
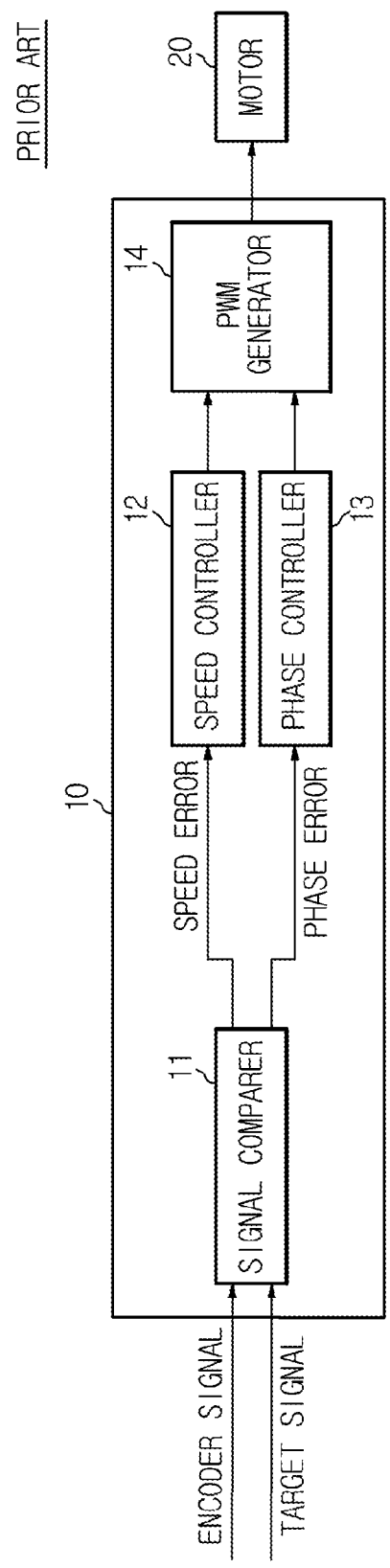
FIG. 1 is a control block diagram of a conventional motor control apparatus.
Figure 2:
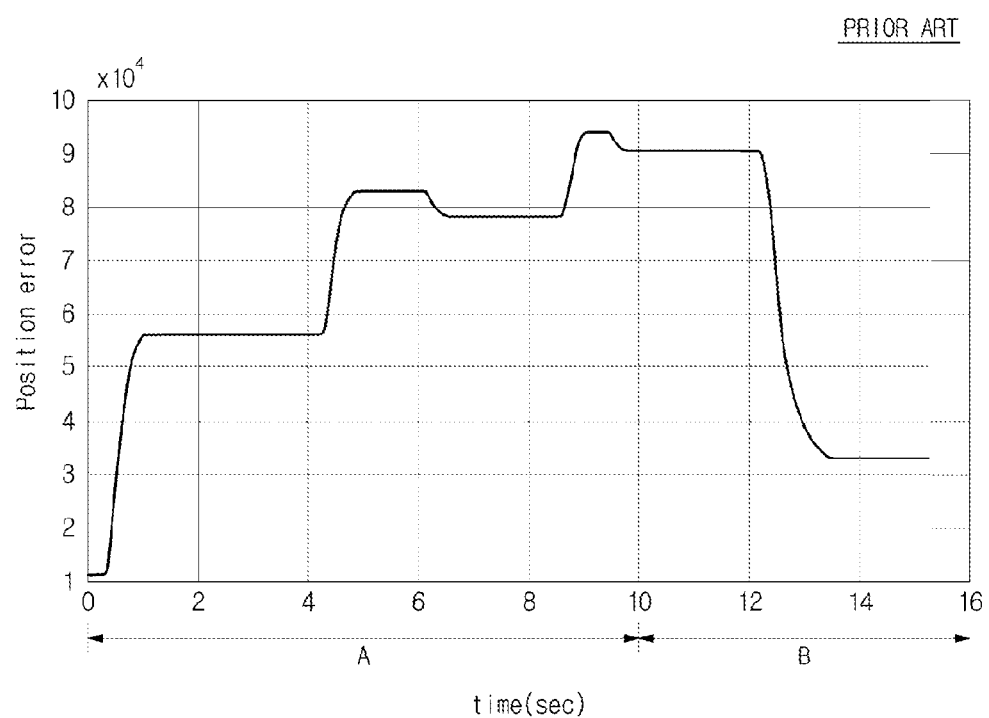
FIG. 2 is a graph of position error caused in a motor controlled by the conventional motor control apparatus.

FIG. 1 is a control block diagram of a conventional motor control apparatus 10 and FIG. 2 is a graph of position error caused in a motor 20 controlled by the conventional motor control apparatus 10.

Referring to FIG. 1, the conventional motor control apparatus 10 includes a signal comparer 11 to compare rotation information of the motor 20, obtained from a feedback sensor installed in the motor 20, with a target signal, a speed controller 12 to calculate a speed control value of the motor 20 according to the comparison result of the signal comparer 11, a phase controller 13 to calculate a phase control value of the motor 20, and a pulse width modulation (PWM) generator 14 to generate a PWM signal to be input to the motor 20 based on the control values calculated by the controllers 12 and 13.

The signal comparer 11 compares the rotation information of the motor 20 with the target signal to detect speed error and phase error. The speed controller 12 calculates the speed control value of the motor 20 in order to compensate for the detected speed error. The phase controller 13 calculates the phase control value in order to compensate for the detected phase error. In addition, when the motor control apparatus 10 employs PWM control, the PWM generator 14 generates a PWM signal corresponding to a control value obtained by summing the speed control value and the phase control value and inputs the PWM signal to the motor 20.

When feedback control of the motor 20 is performed by the motor control apparatus 10 of FIG. 1, if strong external disturbance is applied to the motor 20 and load gradually increases, as illustrated in FIG. 2, position error is caused by as much as the changed load (period A). In this case, since there is no element to compensate for the position error, although an initial load state is restored (period B), error is caused with respect to initial position error.

Accordingly, a motor control apparatus according to an embodiment performs position control as well as speed control and phase control of a motor so as to compensate for position error due to disturbance.

Figure 3:
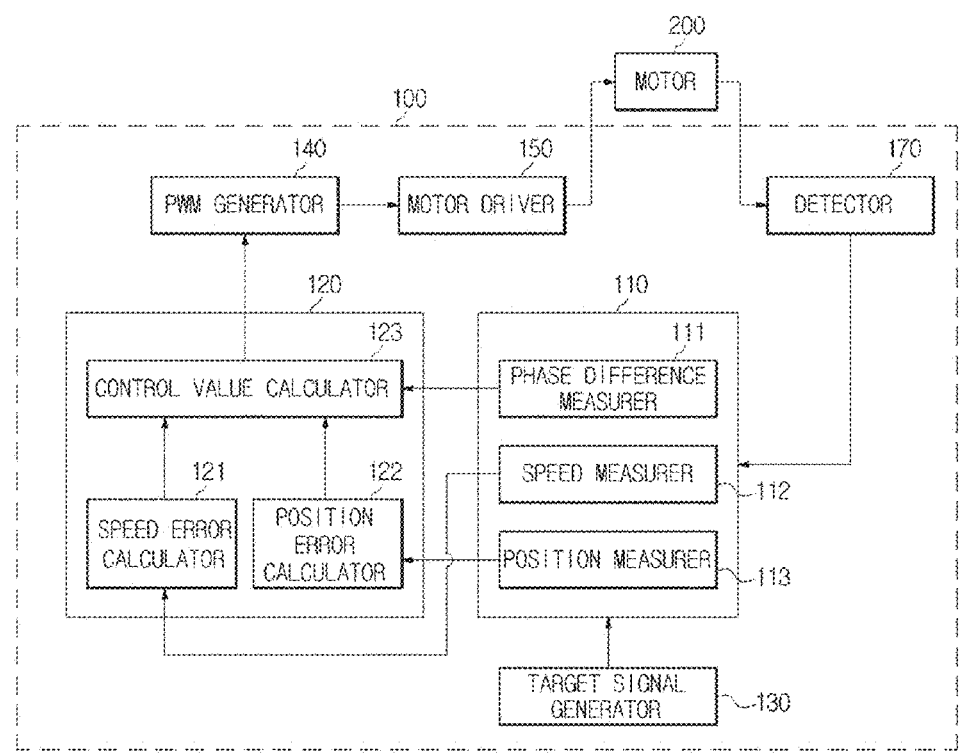
FIG. 3 is a control block diagram of a motor control apparatus according to an embodiment.

FIG. 3 is a control block diagram of a motor control apparatus 100 according to an embodiment.

Referring to FIG. 3, the motor control apparatus 100 includes a detector 170 to detect rotation information of a motor 200, a target signal generator 130 to generate a target signal corresponding to a command value input to the motor 200, a measurer 110 to measure speed, phase difference, and position from a feedback signal and the target signal, which are output from the detector 170, and a calculator 120 to calculate speed error and position error from the measurement values of the measurer 110 and to calculate a control value corresponding to the speed error and the position error.

The detector 170 is installed in the motor 200 or a driver such as a roller axis, detects the rotation information of the motor 200, and outputs a pulse type signal including the rotation information of the motor 200. Here, the rotation information of the motor 200 refers to information such as the rate of speed, phase, position, and the like of the motor 200. The detector 170 may be embodied as an encoder or a frequency generator (FG). When the detector 170 is embodied as an encoder, any type of encoder such as a hole sensor encoder, an optical encoder, and a mechanical encoder may be used.

The measurer 110 includes a speed measurer 112 to measure target speed and speed of the motor 200 using a signal output from the detector 170 and the target signal generated by the target signal generator 130, a position measurer 113 to measure a position and target position of the motor 200, and a phase difference measurer 111 to measure a phase difference between the target signal and the signal output from the detector 170. The signal output from the detector 170 corresponds to one form of feedback signal. Thus, hereinafter, a signal output from a detector is referred to as a feedback signal. Detailed operations of measuring speed, phase difference, and position by each measurer will be described below.

The calculator 120 includes a speed error calculator 121 to calculate speed error according to a difference between the target speed and the speed of the motor 200, measured by the speed measurer 112, a position error calculator 122 to calculate position error according to a difference between the target position and the position of the motor 200, measured by the position measurer 113, and a control value calculator 123 to calculate the control values in order to compensate for the speed error, the position error, and the phase difference. Detailed operations of calculating the error and control values by the calculators will be described below.

The motor control apparatus 100 according to an embodiment may adjust current or a voltage to control the rate of rotation of the motor 200. However, the motor control apparatus 100 may employ PWM control in which a pulse width of an input signal is controlled. In this case, the motor control apparatus 100 may include a PWM generator 140 to generate a PWM signal. The PWM signal output from the PWM generator 140 is input to a motor driver 150 to drive the motor 200 to allow the motor driver 150 to drive the motor 200 according to the control value output from the calculator 120.

The motor driver 150 may include an H-bridge circuit. When the motor 200 is a BLDC motor, the motor 200 includes three coils, and thus, the motor driver 150 may include a 3-phase switching FET.

Figure 4:
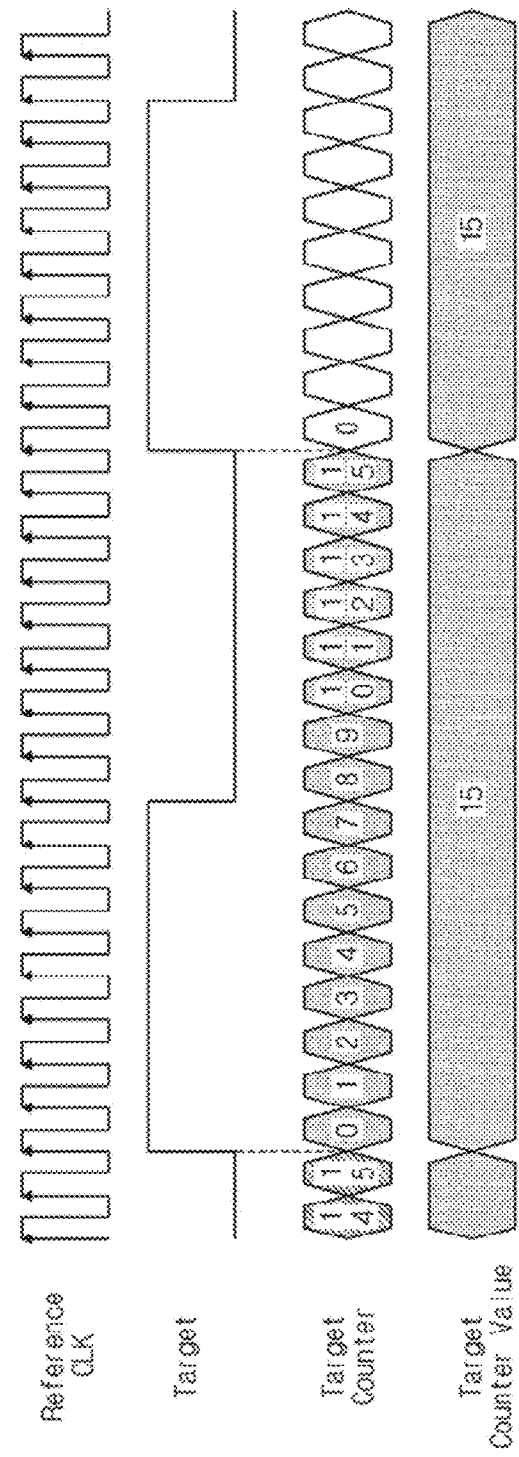
FIG. 4 is a timing diagram illustrating an operation of measuring motor speed by a speed measurer.
Figure 5:
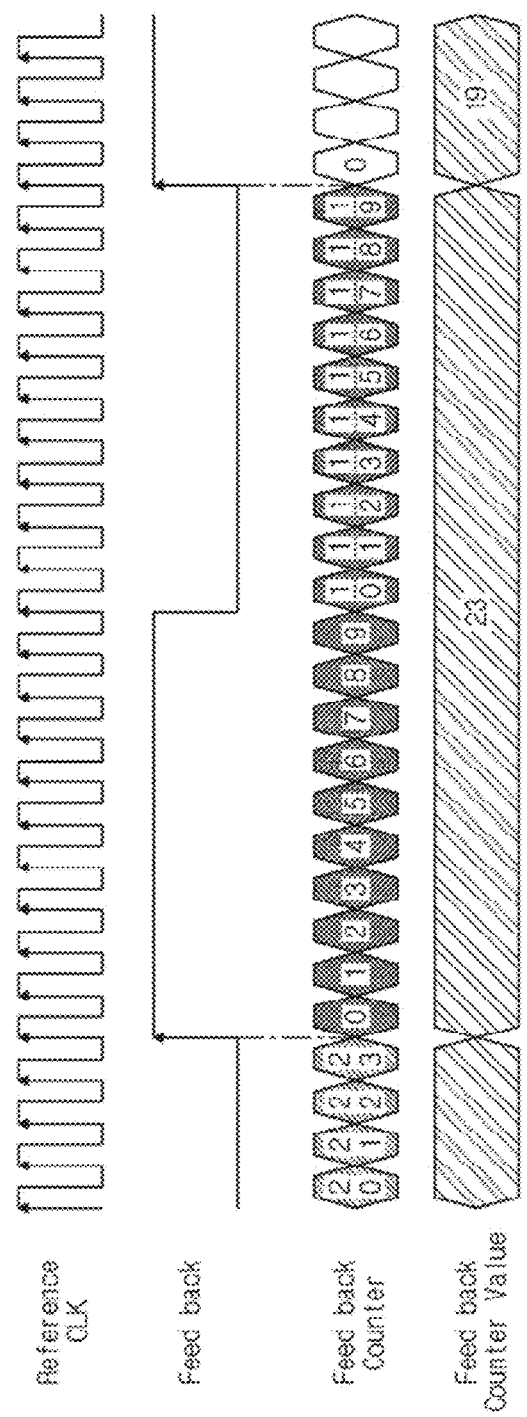
FIG. 5 is a timing diagram illustrating an operation of measuring target speed by a speed measurer.
Figure 6:
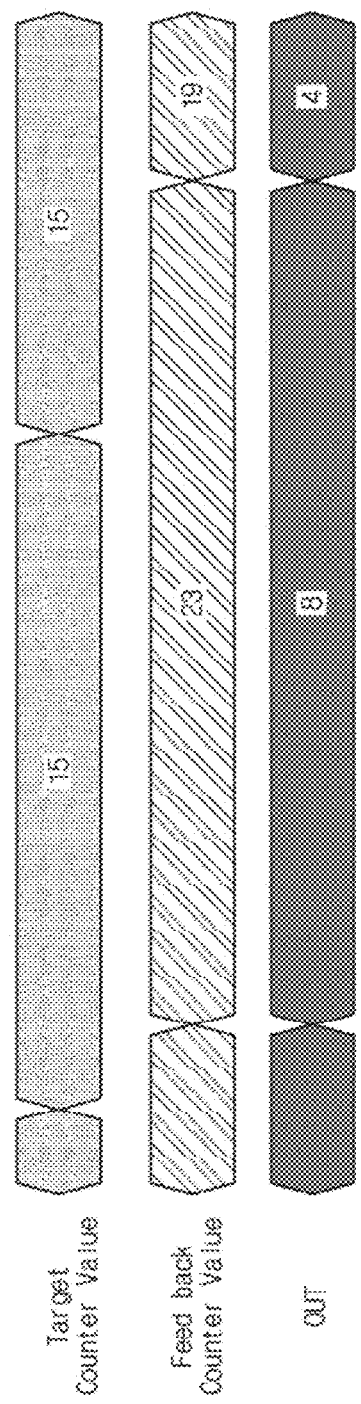
FIG. 6 is a timing diagram illustrating an operation of calculating speed error by a speed error calculator.

FIG. 4 is a timing diagram illustrating an operation of measuring motor speed by the speed measurer 112, FIG. 5 is a timing diagram illustrating an operation of measuring the target speed by the speed measurer 112, and FIG. 6 is a timing diagram illustrating an operation of calculating speed error by the speed error calculator 121.

Referring to FIGS. 4 and 5, the speed measurer 112 measures the target speed and speed of the motor 200 using a reference clock signal Reference CLK.

The reference clock signal Reference CLK is a clock signal having a speed that is several tens of times greater than a frequency of a feedback signal. The speed measurer 112 includes a counter to count the number of pulses of the reference clock signal Reference CLK in a predetermined period and measures the speed. That is, the target speed and speed of the motor 200 may be represented by the number of pulses of the reference clock signal Reference CLK.

Referring to FIG. 4, the speed measurer 112 counts the number of pulses of the reference clock signal Reference CLK for one period of the target signal output from the target signal generator 130. That is, the number of pulses of the reference clock signal Reference CLK is counted from a rising edge to a next rising edge of the target signal or from a falling edge to a next falling edge of the target signal. When the target signal output from the target signal generator 130 and the reference clock signal Reference CLK are signals illustrated in FIG. 4, the number of pulses of the reference clock signal Reference CLK, counted for one period of the target signal, is 15 and the number of pulses of the reference clock signal Reference CLK, counted in the next period, is 15.

Referring to FIG. 5, the speed measurer 112 counts the number of pulses of a reference clock signal Reference CLK for one period of the feedback signal output from the detector 170. That is, the number of pulses of the reference clock signal Reference CLK is counted from a rising edge to a next rising edge of the feedback signal or from a falling edge to a next falling edge of the feedback signal. Here, the reference clock signal Reference CLK is the same as the reference clock signal Reference CLK used to measure speed of the target signal. When the feedback signal 170 and the reference clock signal Reference CLK are signals illustrated in FIG. 5, the number of pulses of the reference clock signal Reference CLK, counted for one period of the feedback signal, is 23 and the number of pulses of the reference clock signal Reference CLK, counted for a next period, 19.

Referring to FIG. 6, the speed error calculator 121 calculates speed error from the target speed and speed of the motor 200, measured by the speed measurer 112. When the speed of the motor 200 is greater than the target speed of the motor 200, a speed error value may have a negative sign in order to reduce a command voltage applied to the motor 200. In an opposite case, the speed error value may have a positive signal in order to increase a voltage applied to the motor 200. When the target speed and speed of the motor 200 are signals illustrated in FIGS. 4 and 5, the speed error calculator 121 calculates and outputs 8 and 4 as speed error values at control times. However, a sign of an output value may be changed according to system configuration.

Figure 7:
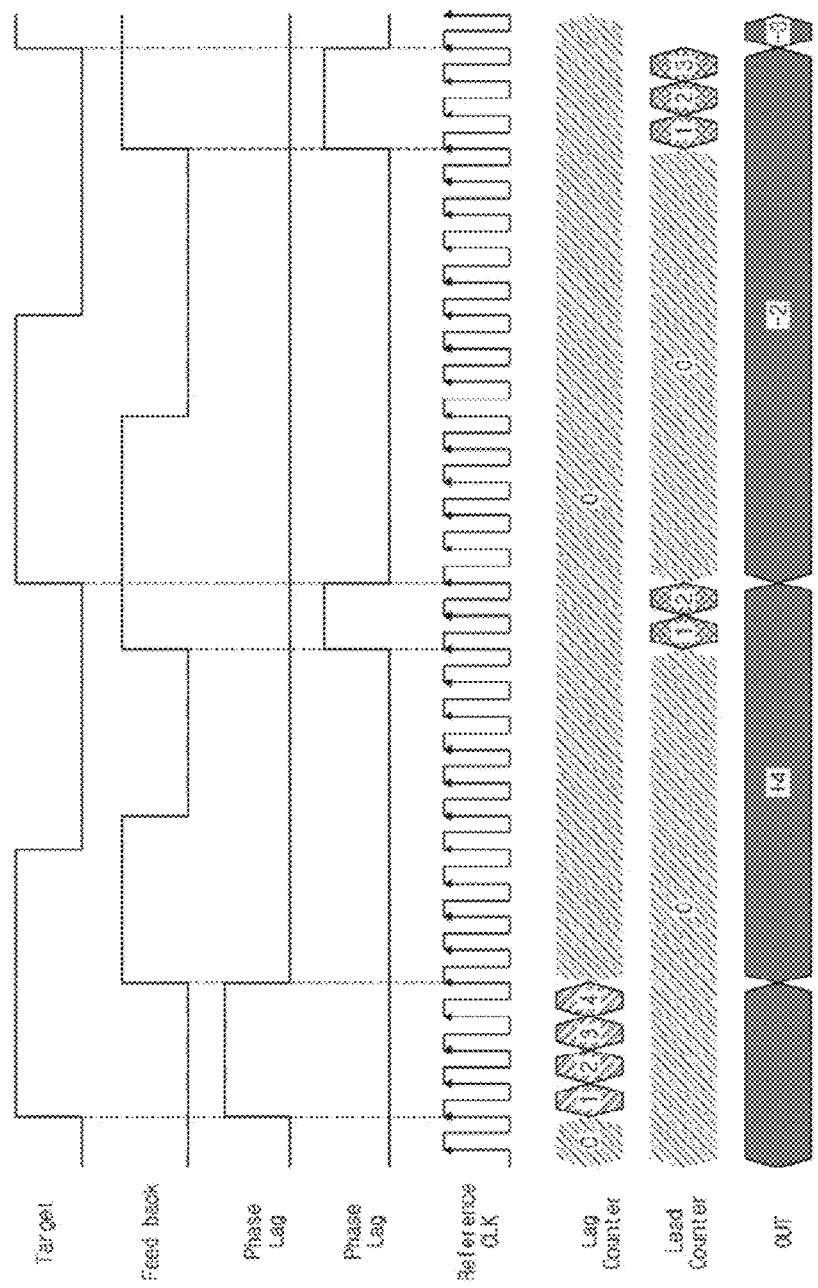
FIG. 7 is a timing diagram of an operation of measuring a phase difference by a phase difference measurer.

FIG. 7 is a timing diagram of an operation of measuring a phase difference by the phase difference measurer 111.

The phase difference measurer 111 measures a phase difference between the target signal and the feedback signal of the motor 200 and marks the phase difference with an appropriate sign to output the phase difference as phase error. As illustrated in FIG. 7, when the phase difference between the target signal and the feedback signal of the motor 200 is measured, the same reference clock signal as the reference clock signal Reference CLK used by the speed measurer 112 may also be used. Thus, the phase difference between the target signal and the feedback signal of the motor 200 may be represented by the number of pulses of the reference clock signal.

In detail, when the number of pulses of the reference clock signal Reference CLK between a rising edge of the target signal and a rising edge of the feedback signal is counted, the counted pulse number corresponds to a phase difference between the two signals. In this case, when the rising edge of the target signal is ahead of the rising edge of the feedback signal (which corresponds to Lag), a value obtained by marking the phase difference with a positive sign may correspond to phase error in order to increase a command voltage applied to the motor 200. On the other hand, when the rising edge of the feedback signal is ahead of the rising edge of the target signal (which corresponds to Lead), a value obtained by marking the phase difference with a negative sign may correspond to the phase error in order to reduce the command voltage applied to the motor 200. However, this case is merely an embodiment of the present. According to system configuration, signs may be marked in an opposite way and falling edges instead of rising edges may be compared with each other.

As illustrated in FIG. 7, with regard to first rising edges, a rising edge of the target signal is ahead of a rising edge of the feedback signal, which corresponds to Lag, and the number of pulses of the reference clock signal Reference CLK counted between the rising edge of the target signal and the rising edge of the feedback signal is 4, and thus, phase error is output as +4. With regard to second rising edges, the rising edge of the feedback signal is ahead of the rising edge of the target signal, which corresponds to Lead, and the number of pulses of the reference clock signal Reference CLK counted between the rising edge of the target signal and the rising edge of the feedback signal is 2, and thus, phase error is output as −2. With regard to third rising edges, the rising edge of the feedback signal is ahead of the rising edge of the target signal, which corresponds to Lead, and the number of pulses of the reference clock signal Reference CLK counted between the rising edge of the target signal and the rising edge of the feedback signal is 3, and thus, phase error is output as −3.

Figure 8:
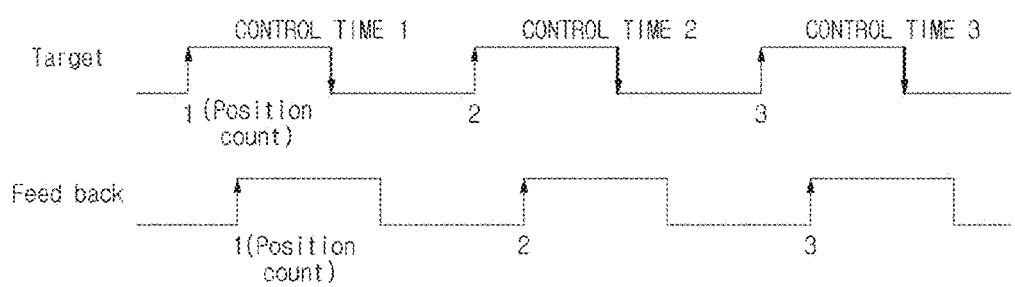
FIG. 8 is a timing diagram illustrating a position measuring operation of a position measurer and an error calculation operation of a position error calculator.

FIG. 8 is a timing diagram illustrating a position measuring operation of the position measurer 113 and an error calculation operation of the position error calculator 122.

Referring to FIG. 8, the position measurer 113 may count the rising edge or falling edge of the target signal and feedback signal to measure a position count.

Position information is updated at edges, and thus, it is important to determine control time. The control time refers to a point of time when a series of processes of calculating errors and calculating a control value appropriate for the errors to control the motor 200 is performed. In detail, when the control time is a point of time when a position is measured, a position error value may oscillate due to minute timing differences, and thus, a point of time having 180 degrees of a phase difference with a point of time of measuring a position with respect to the target signal may be considered as the control time.

In addition, when the control time is determined with respect to the target signal instead of the feedback signal, position control is performed at predetermined time intervals at low speed, thereby improving constant speed performance.

In the embodiment illustrated in FIG. 8, since position is measured at a rising edge, the falling edge of the target signal may be the control time. On the other hand, when the position is measured at a falling edge, the rising edge of the target signal may be the control time. The motor control apparatus may periodically perform control, and thus, may perform control every falling edge or rising edge.

In the embodiment illustrated in FIG. 8, both position counts of the target signal and the feedback signal at control time 1 are 1, both position counts of the target signal and the feedback signal at control time 2 are 2, and both position counts of the target signal and the feedback signal at control time 3 are 3.

The position error calculator 122 subtracts the position count of the feedback signal from the position count of the target signal to calculate position count error. When the position of the target signal is ahead of the position of the feedback signal, the motor control apparatus 100 needs to reduce a command voltage applied to the motor 200. In an opposite case, the motor control apparatus 100 needs to increase the command voltage. Thus, a sign of the position count error may be changed according to configuration of the motor control apparatus 100, and the position count of the target signal may be subtracted from the position count of the feedback signal.

As described above, speed error and phase difference are calculated and measured using the number of pulses of the reference clock signal. Thus, the position error calculator 122 multiplies position count error by reference time in order to match units of the position error and speed error to a unit of the phase difference. That is, the position error may be calculated according to Expression 1 below.

$$P_{err} = PC_{err} * T \quad (1)$$

$P_{err}$ is position error, $PC_{err}$ is position count error, and T is reference time that is the number of pulses of a reference clock signal counted for one period of the target signal.

Figure 9:
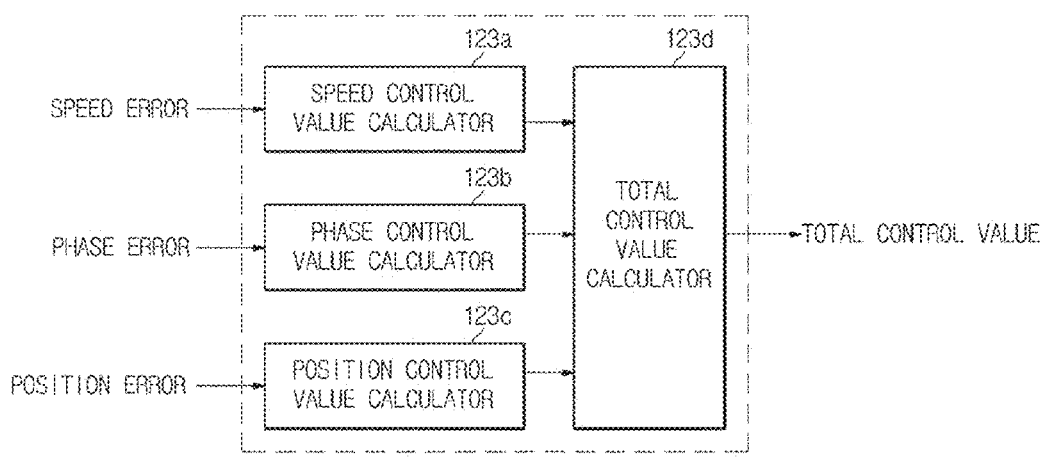
FIG. 9 is a control block diagram of a control value calculator according to an embodiment.

FIG. 9 is a control block diagram of a control value calculator 123-1 according to an embodiment.

Referring to FIG. 9, the control value calculator 123-1 includes a speed control value calculator 123a to calculate a control value for compensating for speed error of a motor, a phase control value calculator 123b to calculate a control value for compensating for phase error of the motor, a position control value calculator 123c to calculate a control value for compensating for position error of the motor, and a total control value calculator 123d for calculation of a total control value.

According to an embodiment, the control value calculator 123 may perform calculation for proportional integral differential (PID) control. The PID control is one form of feedback control performed by combining three controls such as proportional control, proportional integral control, and proportional differential control and may be performed according to Expressions 2 to 4 below.

$$V_c = (V_{err})*K_{vp} + (\int V_{err})*K_{vi} + (d/dt(V_{err}))*K_{vd} \quad (2)$$

$$Ph_c = (Ph_{err})*K_{php} + (\int Ph_{err})*K_{phi} + (d/dt(Ph_{err}))*K_{phd} \quad (3)$$

$$P_c = (P_{err})*K_{pp} + (\int P_{err})*K_{pi} + (d/dt(P_{err}))*K_{pd} \quad (4)$$

The speed control value calculator 123a multiplies speed error $V_{err}$ output from the speed error calculator 121 by a speed proportional gain $K_{vp}$ to calculate a proportional term, multiplies a value obtained by integrating the speed error $V_{err}$ by a speed integral gain $K_{vi}$ to calculate an integral term, multiplies a value obtained by differentiating the speed error $V_{err}$ by a speed differential gain $K_{vd}$ to calculate a differential term, and sums the resulting values, as shown in Expression 2 above.

The proportional term indicates a control value proportional to an error amount in a current state, the integral term indicates a control value for making error in a steady state as 0, and the differential term is a control value for putting a brake on remarkable change of output values to reduce overshoot and improve stability.

As a result, the control value calculated by the speed control value calculator 123a reduces a command voltage applied to the motor when speed of the feedback signal is greater than speed of the target signal, and increases the command voltage applied to the motor in an opposite case.

The phase control value calculator 123b multiplies a phase proportional gain $K_{php}$ output from the phase difference measurer 111 by phase error $Ph_{err}$ to calculate a proportional term, multiplies a value obtained by integrating the phase error $Ph_{err}$ by a phase integral gain $K_{phi}$ to calculate an integral term, multiplies a phase differential gain $K_{phd}$ by a value obtained by differentiating the phase error $Ph_{err}$ to calculate a differential term, and sums the resulting values, as shown in Expression 3 above.

As a result, the control value calculated by the phase control value calculator 123b reduces the command voltage applied to the motor 200 when a phase of the feedback signal is ahead of a phase of the target signal, which corresponds to Lead, and increases the command voltage applied to the motor 200 in an opposite case.

The position control value calculator 123c multiplies position error $P_{err}$ output from the position error calculator 122 by a position proportional gain $K_{pp}$ to calculate a proportional term, multiplies a value obtained by integrating the position error $P_{err}$ by a position integral gain $K_{pi}$ to calculate an integral term, multiplies a value obtained by differentiating the position error $P_{err}$ by a position differential gain $K_{pd}$ to calculate a differential term, and sums the resulting values, as shown in Expression 4 above.

As a result, the control value calculated by the position control value calculator 123c reduces the command voltage applied to the motor 200 when a position of the feedback signal is ahead of a position of the target signal, and increases the command voltage applied to the motor 200 in an opposite case.

The gain values used by the above control value calculators are calculated via a mathematical or experimental/empirical method. This calculation process is referred to as tuning. Examples of tuning methods may include a step response method, a critical gain method, a Ziegler and Nichols method, a Taguchi method, and the like. According to an embodiment, the gain values used by the above control value calculators may be determined using one of various tuning methods.

In addition, each control value calculator may calculate a control value of the motor using various control methods such as P control, PI control, PD control, etc. as well as PID control.

In addition, the control values calculated by the control value calculators are each input to the total control value calculator 123d and the total control value calculator 123d sums the control values to output a total control value. When the motor control apparatus 100 controls the motor 200 according to PWM control, the PWM generator 140 generates a PWM signal from the total control value and inputs the total control value to the motor driver 150, and the motor driver 150 drives the motor 200 to be rotated according to the calculated control value.

Figure 10:
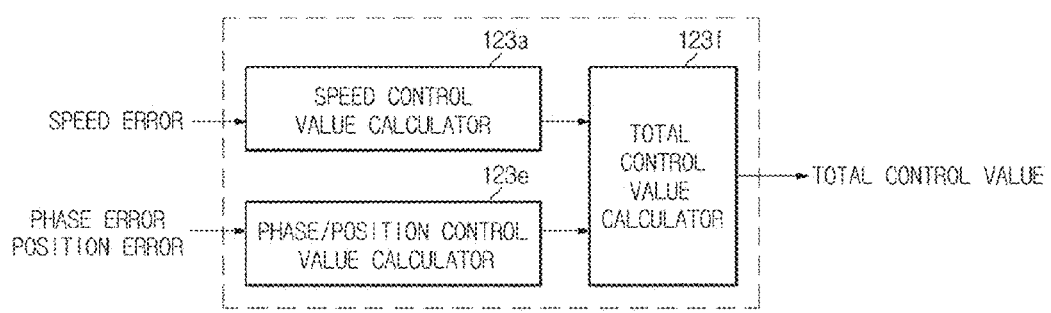
FIG. 10 is a control block diagram of a control value calculator according to an embodiment.

FIG. 10 is a control block diagram of a control value calculator 123-2 according to an embodiment.

In the above embodiment illustrated in FIG. 9, the calculators of the control value calculator 123-1 calculate the position control value and the phase control value, respectively. However, according to the present embodiment, the control value calculator 123-2 combines position error and phase error to calculate a control value for efficient gain design.

Thus, according to the present embodiment, the control value calculator 123-2 includes the speed control value calculator 123a for calculation of a control value for compensating for speed error of the motor, a phase/position control value calculator 123e for calculation of a control value for compensating for phase error and position error of the motor, and a total control value calculator 123f for calculation of a total control value.

An operation of the speed control value calculator 123a is the same as in the above embodiment illustrated in FIG. 9, and thus, a detailed description thereof is omitted herein.

The phase/position control value calculator 123e combines the phase error and position error of the motor to calculate a control value corresponding to the combined error. As described with reference to Expression 1 above, since units of the position error and phase error are the same, the phase/position control value calculator 123e may combine the position error and the phase error to calculate phase/position error $PP_{err}$.

In addition, the phase/position control value calculator 123e calculates the phase/position control value according to Expression 5 below.

$$PP_c = (PP_{err})*K_{p3} + (\int PP_{err})*K_{ppi} + (d/dt(PP_{err}))*K_{ppd} \qquad (5)$$

The phase/position control value calculator 123e multiplies the phase/position error $PP_{err}$ by a phase/position proportional gain $K_{P3}$ to calculate a proportional term, multiplies a value obtained by integrating the phase/position error $PP_{err}$ by a phase/position integral gain $K_{ppi}$ to calculate an integral term, multiplies a value obtained by differentiating the phase/position error $PP_{err}$ by a phase/position differential gain $K_{ppd}$ to calculate a differential term, and sums the resulting values. Since the phase error and the position error are combined to calculate one control value, a gain value to be designed may be reduced by half compared to a case in which the phase control value and the position control values are separately calculated, and thus, control may be effectively performed.

The total control value calculator 123f combines the speed control value and the phase/position control value to calculate a total control value.

FIGS. 11 through 17 are timing diagrams illustrating detailed examples of calculating phase/position error according to the embodiment illustrated in FIG. 10. With reference to FIGS. 11 through 17, calculation results of phase/position error will be described with regard to various cases. Hereinafter, in an embodiment, it may be assumed that a period of the target signal is constant in order to easily indicate the phase/position error in the timing diagrams.

Figure 11:
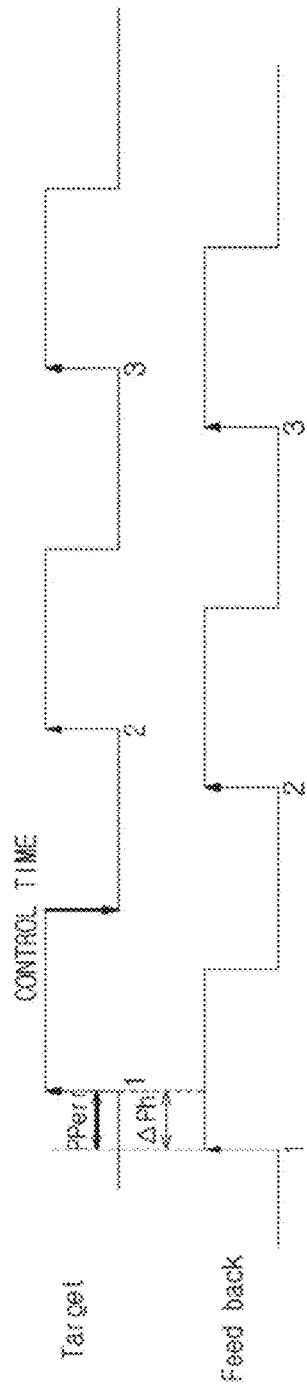
FIG. 11 is a timing diagram illustrating a calculation result of phase/position error when position error is 0 in Lead.

FIG. 11 is a timing diagram illustrating a calculation result of phase/position error when position error is 0 in Lead.

Referring to FIG. 11, both position counts of a target signal and feedback signal are 1 based on control time, and thus, position error is 0 and a phase difference ΔPh is illustrated in FIG. 11. Here, the phase difference ΔPh refers to an absolute phase difference between the target signal and the feedback signal. The phase difference measurer 111 outputs phase error $Ph_{err}$ marked with an appropriate sign according to whether the phase difference ΔPh corresponds to Lead or Lag. The case of FIG. 11 corresponds to Lead, and thus, −ΔPh is the phase error $Ph_{err}$, and the phase/position error $PP_{err}$ calculated by the phase/position control value calculator 123e is the phase error $Ph_{err}$.

Figure 12:
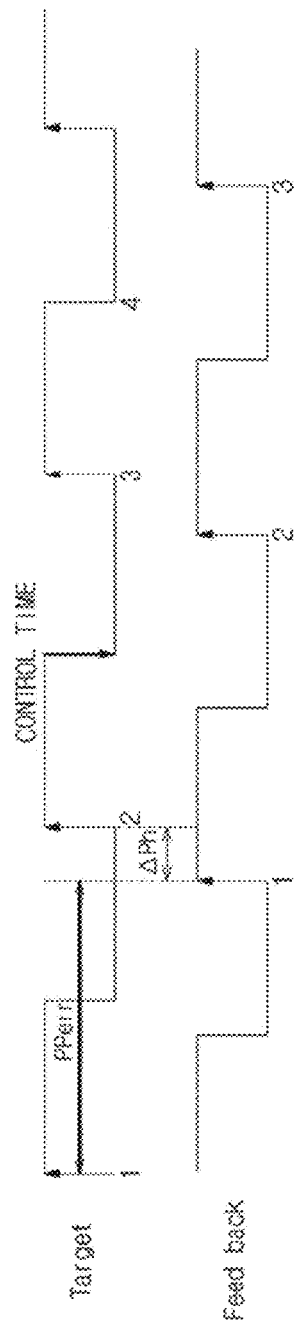
FIG. 12 is a timing diagram illustrating a calculation result of phase/position error when a position count of a feedback signal lags behind a position count of a target signal in Lead.

FIG. 12 is a timing diagram illustrating a calculation result of phase/position error when a position count of a feedback signal lags behind a position count of a target signal in Lead.

Referring to FIG. 12, the position count of the target signal is 2 and the position count of the feedback signal is 1 based on control time, and thus, position error is T (reference time). As described above, T is a value obtained by counting one period of the target signal as a reference clock signal. A phase difference ΔPh is illustrated in FIG. 12 and corresponds to Lead, and thus, phase error output from the phase difference measurer 111 is −ΔPh. When the phase/position control value calculator 123e sums phase error and position error T, phase/position error $PP_{err}$ may be calculated as illustrated in FIG. 12.

Figure 13:
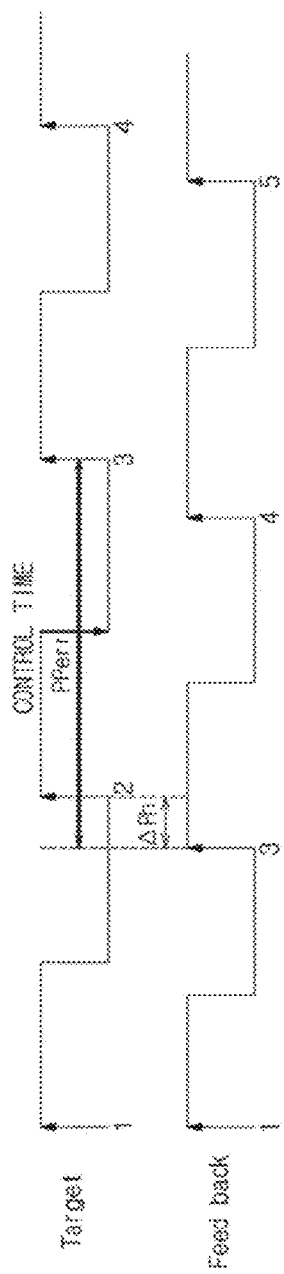
FIG. 13 is a timing diagram illustrating a calculation result of phase/position error when a position count of a feedback signal is ahead of a position count of a target signal in Lead.

FIG. 13 is a timing diagram illustrating a calculation result of phase/position error when a position count of a feedback signal is ahead of a position count of a target signal in Lead.

Referring to FIG. 13, the position count of the target signal is 2 and the position count of the feedback signal is 3 based on control time, and thus, position error is −T. A phase difference ΔPh is illustrated in FIG. 13 and corresponds to Lead. Thus, by summing phase error −ΔPh and position error −T, phase/position error $PP_{err}$ may be calculated as illustrated in FIG. 13.

Figure 14:
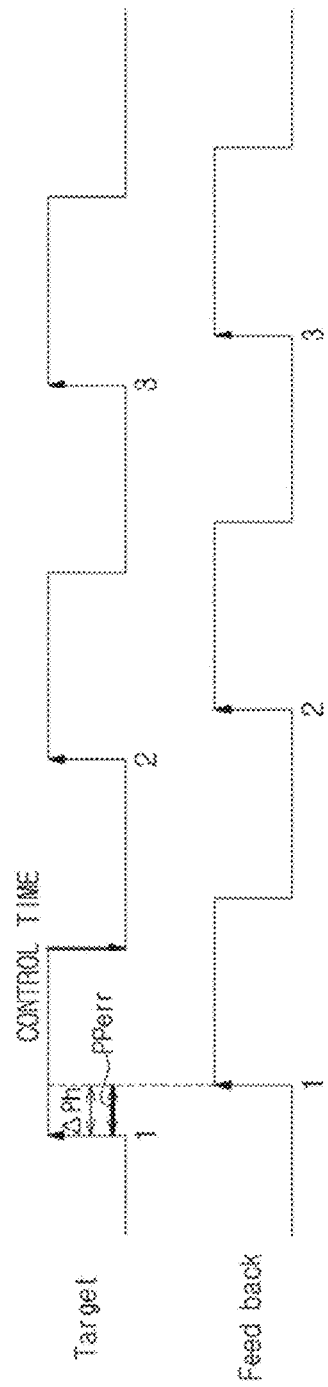
FIG. 14 is a timing diagram illustrating a calculation result of phase/position error when position error is 0 in Lag.

FIG. 14 is a timing diagram illustrating a calculation result of phase/position error when position error is 0 in Lag.

Referring to FIG. 14, both position counts of a target signal and feedback signal are 1 based on control time, and thus, position error is 0. A phase difference ΔPh is illustrated in FIG. 13 and corresponds to Lag. Thus, by summing phase error ΔPh and position error −T, phase/position error $PP_{err}$ may be calculated as illustrated in FIG. 14.

Figure 15:
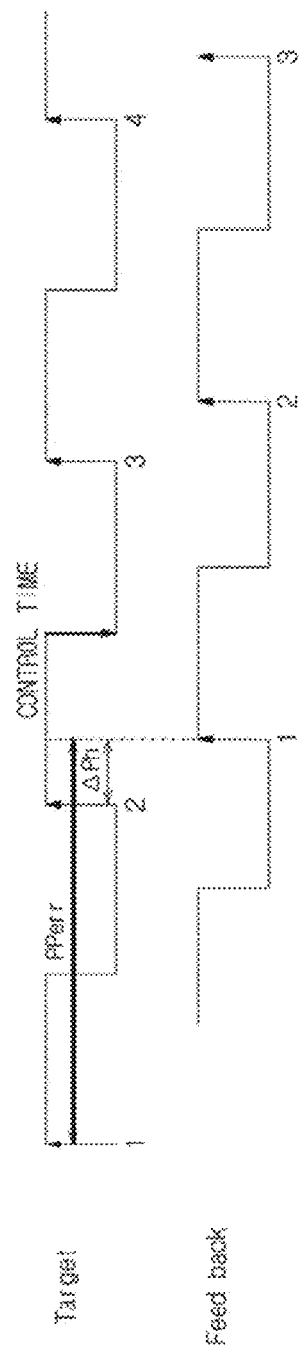
FIG. 15 is a timing diagram illustrating a calculation result of phase/position error when a position count of a feedback signal lags behind a position count of a target signal in Lag.

FIG. 15 is a timing diagram illustrating a calculation result of phase/position error when a position count of a feedback signal lags behind a position count of a target signal in Lag.

Referring to FIG. 15, the position count of the target signal is 2 and the position count of the feedback signal is 1 based on control time, and thus, position error is T. A phase difference ΔPh is illustrated in FIG. 14 and corresponds to Lag, and thus, phase error is ΔPh. In addition, by summing phase error and position error T, phase/position error $PP_{err}$ may be calculated as illustrated in FIG. 15.

Figure 16:
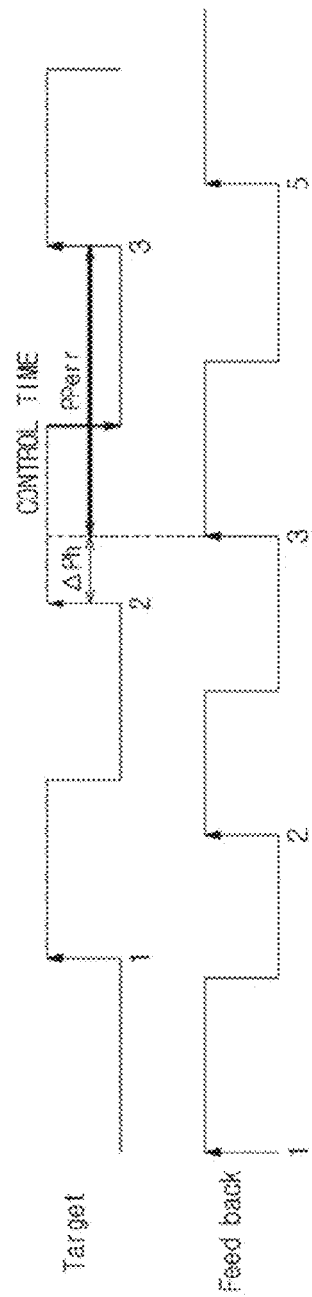
FIG. 16 is a timing diagram illustrating a calculation result of phase/position error when a position count of a feedback signal is ahead of a position count of a target signal in Lag.

FIG. 16 is a timing diagram illustrating a calculation result of phase/position error when a position count of a feedback signal is ahead of a position count of a target signal in Lag.

Referring to FIG. 16, the position count of the target signal is 2 and the position count of the feedback signal is 3 based on control time, and thus, position error is −T. A phase difference ΔPh is illustrated in FIG. 15 and corresponds to Lag, and thus, phase error is ΔPh. In addition, by summing phase error and position error −T, phase/position error $PP_{err}$ may be calculated as illustrated in FIG. 16.

Figure 17:
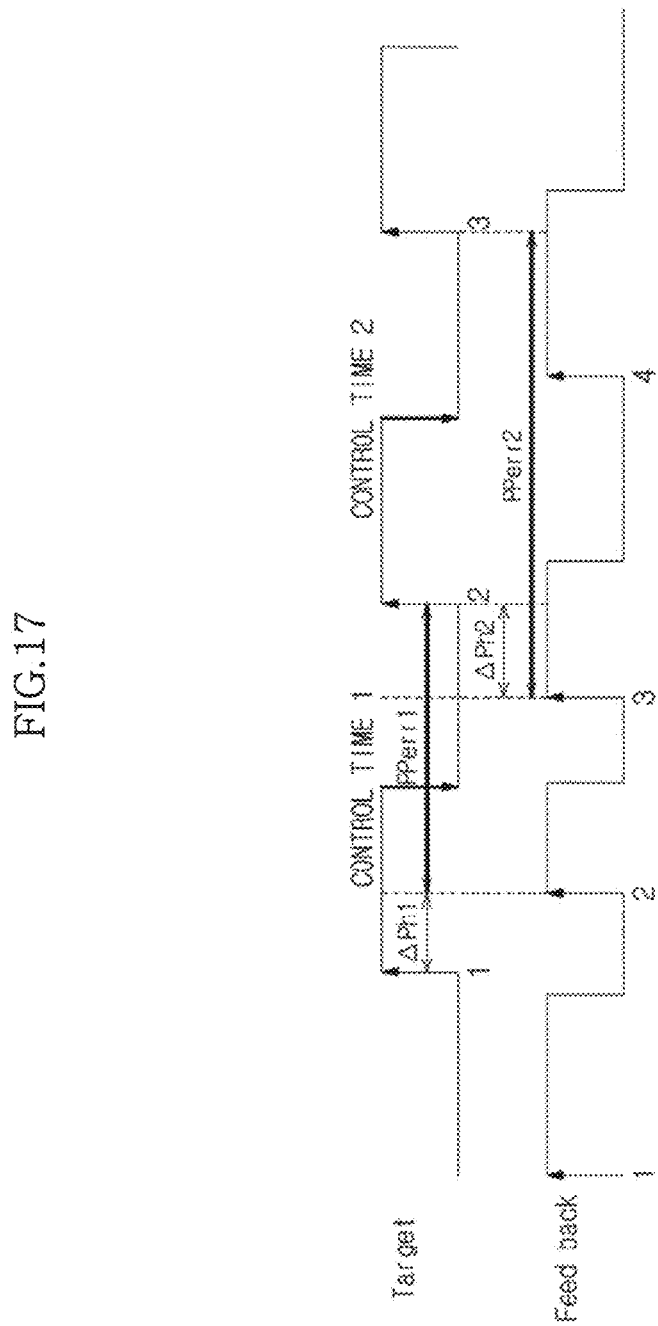
FIG. 17 is a timing diagram illustrating a calculation result of phase/position error when a period or speed of a feedback signal is changed.

FIG. 17 is a timing diagram illustrating a calculation result of phase/position error when a period or speed of a feedback signal is changed.

Referring to FIG. 17, a position count of a target signal is 1 based on control time 1 and a position count of a feedback signal of a feedback signal is 2 based on control time 2, and thus, position error is −T. A phase difference 1 $\Delta Ph_1$ is illustrated in FIG. 17 and corresponds to Lag. Thus, by marking a phase difference 1 $\Delta Ph_1$ with a positive sign and summing the resulting value and position error −T, phase/position error 1 $PP_{err}$ may be calculated as illustrated in FIG. 17.

The position count of the target signal is 2 and the position count of the feedback signal is 3 based on the control time 2, and thus, position error is −T. A phase difference 2 $\Delta Ph_2$ is illustrated in FIG. 17 and corresponds to Lead. Thus, by marking the phase difference 2 $\Delta Ph_2$ with a negative sign and summing the resulting value and position error −T, phase/position error 2 $PP_{err2}$ may be calculated as illustrated in FIG. 17.

Figure 18:
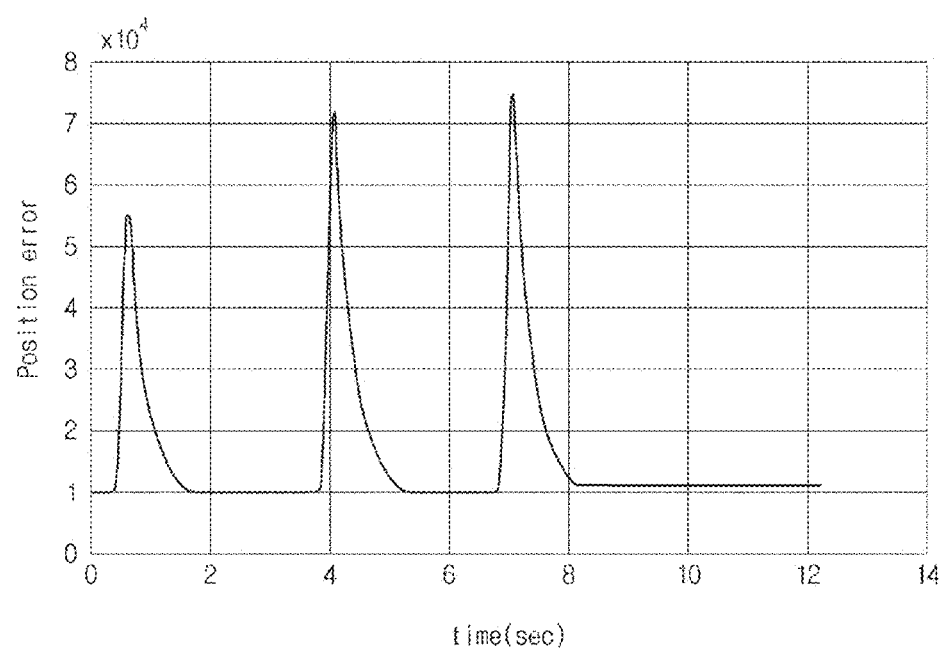
FIG. 18 is a graph showing position error that occurs in a motor controlled by the motor control apparatus according to an embodiment.

FIG. 18 is a graph showing position error that occurs in a motor controlled by the motor control apparatus 100 according to an embodiment.

Referring to FIG. 18, when the motor control apparatus 100 according to the present embodiment is used, even if strong external disturbance is applied to increase load, the motor control apparatus 100 performs control to compensate for position error, and thus, position error that has occurred as load is increased is removed. In addition, position control is periodically or continuously performed together with speed control and phase control. Thus, even if load is gradually increased, position error is quickly removed every step.

Figure 19:
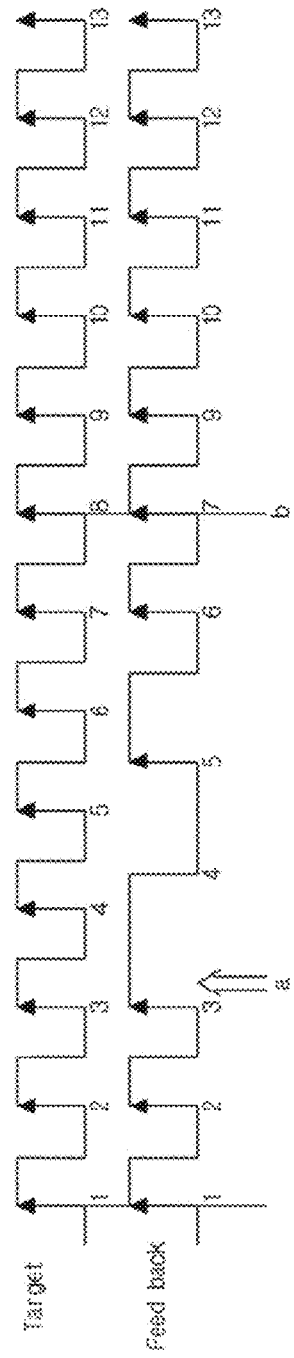
FIG. 19 is a timing diagram of a target signal and feedback signal of a motor controlled by a motor control apparatus 10 which performs speed and phase control only.
Figure 20:
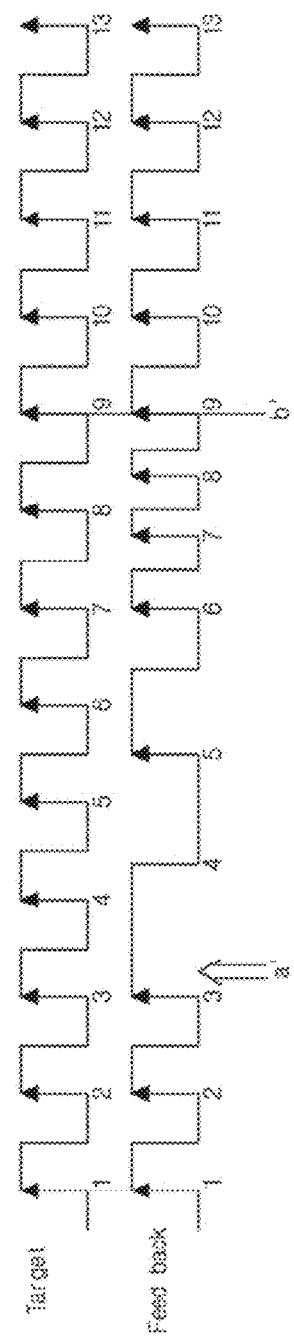
FIG. 20 is a timing diagram of a target signal and feedback signal of a motor controlled by a motor control apparatus according to an embodiment.

FIG. 19 is a timing diagram of a target signal and feedback signal of a motor controlled by the motor control apparatus 10 which performs speed and phase control only and FIG. 20 is a timing diagram of a target signal and feedback signal of a motor controlled by the motor control apparatus 100 according to an embodiment.

As seen from FIG. 19, when a disturbance is applied at a point of time a and error occurs in the feedback signal, speed error and phase error are compensated for by the motor control apparatus 10, and simultaneously, speeds and phases of the target signal and feedback signal correspond to each other at a point of time b, but error is still present in a position count. When the motor control apparatus 10 is used in an image forming apparatus, such position error may degrade image quality.

Referring to FIG. 20, when a disturbance is applied at a point of time a' and error occurs in the feedback signal, position error as well as speed error and phase error is compensated for by the motor control apparatus 100, and simultaneously, speeds, phases, and positions of the target signal and feedback signal correspond to each other at a point of time b'.

An image forming apparatus according to an embodiment includes the motor control apparatus 100 according to the aforementioned embodiment. The motor control apparatus 100 controls the motor 200 used in the image forming apparatus. In this case, the motor 200 may be at least one of a motor used for paper transfer, a motor used for rotation of a photoreceptor drum, a motor used for rotation of a fusing unit, and a motor used for a transfer unit. Thus, the image forming apparatus according to an embodiment may increase image quality and maintain constant leading edge margin by controlling the motor 200 via the motor control apparatus 100 according to the above-described embodiment. However, embodiments are not limited to the aforementioned motors. In addition, motors in various uses in the image forming apparatus may be controlled by a motor control apparatus.

Reference will now be made in detail to a motor control method according to an embodiment, examples of which are illustrated in the accompanying drawings.

Figure 21:
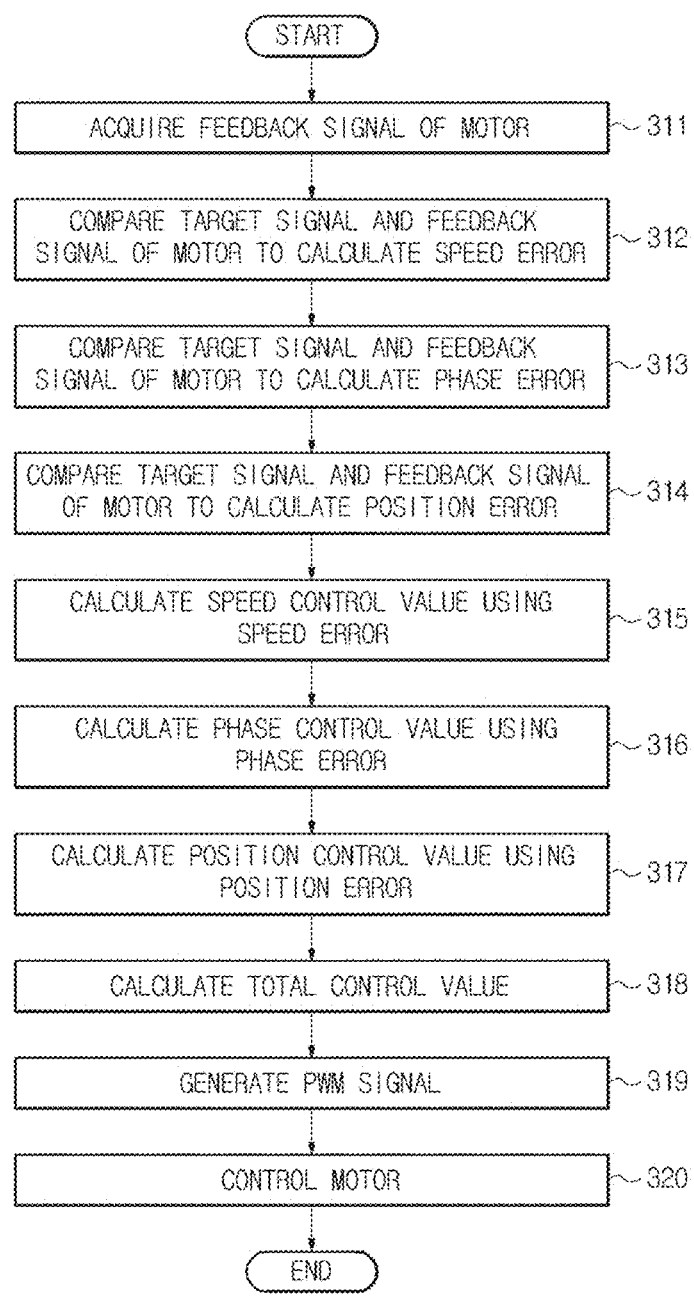
FIG. 21 is a flowchart of a motor control method according to an embodiment.

FIG. 21 is a flowchart of a motor control method according to an embodiment.

Referring to FIG. 21, a feedback signal containing rotation information of a motor is acquired from a detector installed in the motor (311). Here, the motor may be a BLDC motor or a DC motor and the detector may be an encoder or pulse generator (FG) that detects the rotation information of the motor and outputs the detected information as a pulse type signal. The rotation information of the motor includes speed, phase, and position information of the motor.

A target signal and the feedback signal are compared to calculate speed error (312). The target signal corresponds to a command value, in particular, a command voltage applied to the motor. A reference clock signal may be used to calculate the speed error. Based on a reference clock with a greater frequency than a frequency of the feedback signal, the number of pulses of the reference clock from a rising edge of the target signal to a next rising edge is counted, the number of pulses of the reference clock from a rising edge to a next rising edge of the feedback signal is counted, and a difference in the counted pulse numbers is calculated. Alternatively, the number of pulses of the reference clock may be counted based on a falling edge. When the speed of the target signal is greater than that of the feedback signal, the command voltage applied to the motor needs to be increased, and thus, the difference in the counted pulse numbers is marked with a positive sign. When the speed of the feedback signal is greater than the speed of the target signal, the command voltage applied to the motor needs to be reduced, and thus, the difference in the counted pulse numbers is marked with a negative sign.

The target signal and the feedback signal are compared to calculate phase error (313). The same reference clock signal as in the case of the speed error may be used to calculate the phase error. The number of pulses of the reference clock signal counted between a rising edge of the feedback signal and a rising edge of the target signal corresponds to a phase difference. In addition, in a case of Lead, the phase difference is marked with a negative sign, and in a case of Lag, is marked with a positive sign, to calculate the phase error.

The target signal and the feedback signal are compared to calculate position error (314). Position counts are measured by counting every rising edge of the target signal and feedback signal, and a difference between the position count of the target signal and the position count of the feedback signal is calculated based on control time. When the position count of the feedback signal is ahead of the position count of the target signal, the difference in the position counts is marked with a negative sign, and when the position count of the target signal is ahead of the position count of the target signal, the difference in the position counts is marked with a positive sign, to calculate the position error.

Due to the characteristics of the flowchart, the method is illustrated in such a way that calculation is performed in order of speed error, phase error, and position error. However, in reality, with regard to the motor control method according to an embodiment, an order of error calculation is not limited and it may be possible to simultaneously calculate the errors.

In addition, a speed control value is calculated using the calculated speed error (315), a phase control value is calculated using the phase error (316), and a position control value is calculated using the position error (317). Similarly, a calculation order of the control values is not limited.

At least one of various control methods such as PID control, PI control, PD control, P control, and the like may be used to calculate each control value. For example, when PID control is used, the speed control value, the phase control value, and the position control value may be calculated according to Expressions 2 to 4 above.

In addition, the speed control value, the phase control value, and the position control value are summed to calculate a total control value (318), a PWM signal corresponding to the total control value is generated (319) and input to the motor. Thus, the speed, phase, and position of the motor are controlled (320).

Figure 22:
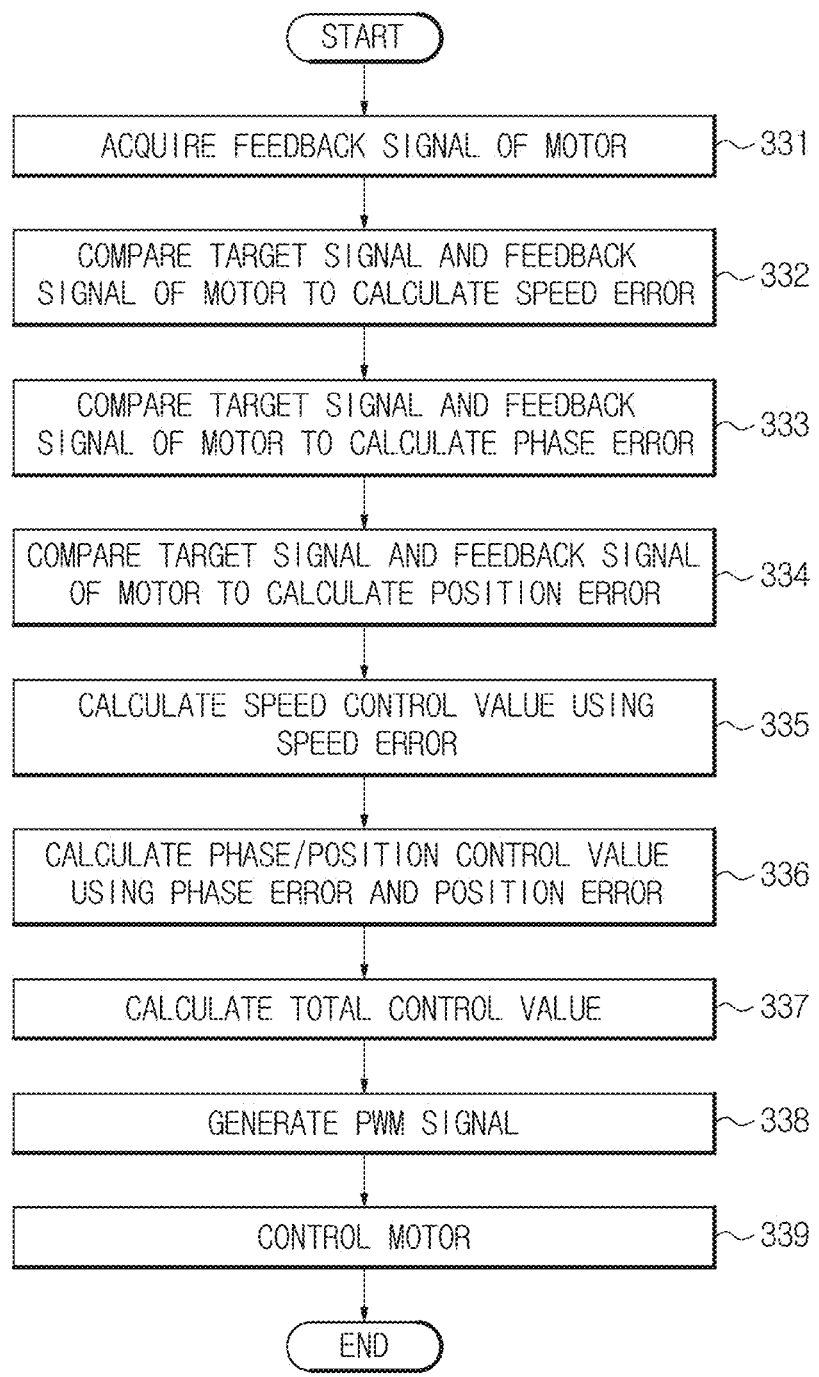
FIG. 22 is a flowchart of a motor control method according to embodiment.

FIG. 22 is a flowchart of a motor control method according to an embodiment.

Referring to FIG. 22, a feedback signal containing rotation information of a motor is acquired from a detector installed in the motor (331). Here, the motor may be a BLDC motor or a DC motor and the detector may be an encoder or pulse generator (FG) that detects the rotation information of the motor and outputs the detected information as a pulse type signal. The rotation information of the motor includes speed, phase, and position information of the motor.

A target signal and the feedback signal are compared to calculate speed error (332). The target signal corresponds to a command value, in particular, a command voltage applied to the motor. A reference clock signal may be used to calculate the speed error. Based on a reference clock with a greater frequency than a frequency of the feedback signal, the number of pulses of the reference clock from a rising edge of the target signal to a next rising edge is counted, the number of pulses of the reference clock from a rising edge to a next rising edge of the feedback signal is counted, and a difference in the counted pulse numbers is calculated. Alternatively, the number of pulses of the reference clock may be counted based on a falling edge. When the speed of the target signal is greater than that of the feedback signal, the difference in the counted pulse numbers is marked with a positive sign. When the speed of the feedback signal is greater than the speed of the target signal, the difference in the counted pulse numbers is marked with a negative sign.

The target signal and the feedback signal are compared to calculate phase error (333). The same reference clock signal as in the case of the speed error may be used to calculate the phase error. The number of pulses of the reference clock signal counted between the rising edge of the feedback signal and the rising edge of the target signal corresponds to a phase difference. In addition, in a case of Lead, the phase difference is marked with a negative sign, and in a case of Lag, is marked with a positive sign, to calculate the phase error.

The target signal and the feedback signal are compared to calculate position error (334). Position counts are measured by counting every rising edge of the target signal and feedback signal, and a difference between the position count of the target signal and the position count of the feedback signal is calculated based on control time. When the position count of the feedback signal is ahead of the position count of the target signal, the difference in the position counts is marked with a negative sign, and when the position count of the target signal is ahead of the position count of the target signal, the difference in the position counts is marked with a positive sign, to calculate the position error.

Due to the characteristics of the flowchart, the method is illustrated in such a way that calculation is performed in order of speed error, phase error, and position error. However, as described with regard to FIG. 21, in reality, with regard to the motor control method according to an embodiment, an order of error calculation is not limited, and it may be possible to simultaneously calculate the errors.

In addition, a speed control value is calculated using the calculated speed error (335), and a phase/position control value is calculated using the calculated phase error and position error (336). Similarly, a calculation order of the control values is not limited. In the motor control method according to the present embodiment, in order to efficiently perform gain design used for a control value, the control value for simultaneously controlling phase and position is calculated by combining the phase error and the position error.

At least one of various control methods such as PID control, PI control, PD control, P control, and the like may be used to calculate each control value. For example, when PID control is used, the speed control value is calculated according to Expression 2 above, and the phase/position control value is calculated according to Expression 5 above. Here, phase/position error $PP_{err}$ may be obtained by summing the phase error and the position error.

According to the present embodiment, when control is performed by combining the phase error and the position error, a gain design value used to calculate each control value may be reduced by half compared to a case in which the phase control value and the position control values are separately calculated.

In addition, the speed control value and the phase/position control value are summed to calculate a total control value (337), a PWM signal corresponding to the total control value is generated (338) and input to the motor. Thus, the speed, phase, and position of the motor are controlled (339).

As is apparent from the above description, during feedback control of a motor used in an electronic product such as an image forming apparatus or the like, position error of the motor and a control value for compensating for the position error are calculated and reflected in the feedback control, thereby quickly removing position error of the motor to improve image quality and to maintain constant leading edge margin.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A motor control apparatus installable in an image forming apparatus, the motor control apparatus comprising:
a detector configured to detect rotation of a motor to output a feedback signal;
a measurer configured to measure position counts by counting at least one of rising edges and falling edges of a target signal and the feedback signal output from the detector using a reference clock signal; and
a calculator configured to determine a control time at which the motor control apparatus performs a control of the motor, to calculate position error of the motor from the measured position counts of the target signal and feedback signal, and to calculate a control value for compensating for the position error,
wherein the determined control time is at a falling edge of the target signal, if the position counts are measured at a rising edge of the target signal, and the determined control time is at a next rising edge of the target signal, if the position counts are measured at the falling edge of the target signal, and
wherein the calculator calculates position count error from a difference between the position count of the target signal and the position count of the feedback signal, and calculates position error of the motor by multiplying the position count error by a reference time.

2. The motor control apparatus according to claim 1, wherein:
the measurer further measures speeds of the feedback signal and the target signal applied to the motor using the reference clock signal, and
the calculator calculates speed error of the motor from the measured speeds of the target signal and feedback signal and further calculates a speed control value for compensating for the speed error.

3. The motor control apparatus according to claim 2, wherein:
the measurer further measures a phase difference between the feedback signal and the target signal applied to the motor using the reference clock signal; and
the calculator further calculates a control value for compensating for the phase difference.

4. The motor control apparatus according to claim 3, wherein the measurer counts the number of pulses of the reference clock signal for one period of the target signal to measure the speed of the target signal, and counts the number of pulses of the reference clock signal for one period of the feedback signal to measure the speed of the feedback signal.

5. The motor control apparatus according to claim 3, wherein the measurer counts the number of pulses of the reference clock signal generated between a rising edge or falling edge of the target signal and a rising edge or falling edge of the feedback signal to measure the phase difference, and marks the phase difference with a sign according to whether the phase difference corresponds to Lead or Lag to output phase error.

6. The motor control apparatus according to claim 5, wherein the calculator comprises:
a speed control value calculator to calculate the speed control value for compensating for the speed error;
a phase control value calculator to calculate the phase control value for compensating for the phase error; and
a position control value calculator to calculate the position control value for compensating for the position error.

7. The motor control apparatus according to claim 5, wherein the calculator comprises:
a speed control value calculator to calculate the speed control value for compensating for the speed error; and
a phase/position control value calculator to calculate a phase/position control value for compensating for phase/position error obtained by combining the phase error and the position error.

8. The motor control apparatus according to claim 7, wherein the calculator performs calculation of the at least one control value according to proportional integral differential (PID) control.

9. The motor control apparatus according to claim 6, wherein the position control value calculator reduces a command voltage applied to the motor when a position of the feedback signal is ahead of a position of the target signal, and increases the command voltage applied to the motor when the position of the feedback signal lags behind the position of the target signal.

10. The motor control apparatus according to claim 6, wherein the phase control value calculator reduces a command voltage applied to the motor when a phase of the feedback is ahead of a phase of the target signal, and increases the command voltage applied to the motor when the phase of the feedback signal lags behind the phase of the target signal.

11. The motor control apparatus according to claim 6, wherein the calculator performs calculation of the at least one control value according to proportional integral differential (PID) control.

12. The motor control apparatus according to claim 3, wherein the calculator calculates speed error of the motor from a difference between the speed of the target signal and the speed of the feedback signal.

13. The motor control apparatus according to claim 3, wherein the calculator starts calculation at a falling edge of the target signal when the measurer measures the position count at a rising edge of the feedback signal or target signal, and starts calculation at a rising edge of the target signal when the measurer measures the position count at a falling edge of the feedback signal or target signal.

14. The motor control apparatus according to claim 3, wherein the motor is at least one of a direct current (DC) motor and a brushless DC (BLDC) motor.

15. The motor control apparatus according to claim 1, wherein the reference time corresponds to the number of pulses of the reference clock signal, counted for one period of the target signal.

16. An image forming apparatus comprising a motor and a motor control apparatus to control the motor, wherein the motor control apparatus comprises:
a detector configured to detect rotation of the motor to output a feedback signal;
a measurer configured to measure position counts by counting at least one of rising edges and falling edges of a target signal and the feedback signal output from the detector using a reference clock signal; and
a calculator configured to determine a control time at which the motor control apparatus performs a control of the motor, to calculate position error of the motor from the measured position counts of the target signal and feedback signal, and to calculate the control value for compensating for the position error,
wherein the determined control time is at a falling edge of the target signal, if the position counts are measured at a rising edge of the target signal, and the determined control time is at a next rising edge of the target signal, if the position counts are measured at the falling edge of the target signal, wherein the calculator calculates position count errors from a difference between the position counts of the target signal and the position counts of the feedback signal, and calculates position errors of the motor by multiplying the position count errors by a reference time.

17. The image forming apparatus according to claim 16, wherein:
the measurer further measures speeds of the feedback signal and the target signal applied to the motor using the reference clock signal, and
the calculator calculates speed error of the motor from the measured speeds of the target signal and feedback signal and further calculate a speed control value for compensating for the speed error.

18. The image forming apparatus according to claim 17, wherein:
the measurer further measures a phase difference between the feedback signal and the target signal applied to the motor using the reference clock signal; and
the calculator further calculates a control value for compensating for the phase difference from the measured speeds of the target signal and feedback signal.

19. The image forming apparatus according to claim 18, wherein the calculator comprises:
a speed control value calculator to calculate the speed control value for compensating for the speed error;
a phase control value calculator to calculate the phase control value for compensating for the phase difference; and
a position control value calculator to calculate a position control value for compensating for the position error.

20. The image forming apparatus according to claim 18, wherein the calculator comprises:
a speed control value calculator to calculate the speed control value for compensating for the speed error; and
a phase/position control value calculator to calculate a phase/position control value for compensating for phase/position error obtained by combining the phase difference and the position error.

21. A motor control method comprising:
acquiring a feedback signal containing rotation information of a motor installed in an image forming apparatus;
comparing the feedback signal and a target signal applied to the motor to calculate position error;
determining a control time at which a control of the motor is performed;
calculating a control value for compensating for the position error; and
controlling the motor according to the calculated control value at least at the determined control time,
wherein the determined control time is at a falling edge of the target signal, if a position count is measured at a rising edge of the target signal, and the determined control time is at a next rising edge of the target signal, if the position count is measured at the falling edge of the target signal,
wherein the comparing of the feedback signal to the target signal applied to the motor to calculate position error comprises calculating position count error from a difference between the position count of the target signal and the position count of the feedback signal, and calculating the position error of the motor by multiplying the position count error by reference time.

22. The motor control method according to claim 21, further comprising:
comparing the feedback signal and the target signal applied to the motor to calculate speed error and phase error; and
calculating a control value for compensating for the speed error and the phase error.

23. The motor control method according to claim 22, wherein the comparing of the feedback signal and the target signal applied to the motor to calculate speed error comprises:
counting the number of pulses of a reference clock signal for one period of the target signal to measure speed of the target signal; and
counting the number of pulses of the reference clock signal for one period of the feedback signal to measure speed of the feedback signal.

24. The motor control method according to claim 23, wherein the comparing of the feedback signal and the target signal applied to the motor to calculate the speed error comprises: calculating a difference between the measured speed of the target signal and the measured speed of the feedback signal.

25. The motor control method according to claim 22, wherein the comparing of the feedback signal and the target signal applied to the motor to calculate the phase error comprises counting the number of pulses of a reference clock signal generated between a rising edge or falling edge of the target signal and a rising edge or a falling edge of the feedback signal to measure a phase difference.

26. The motor control method according to claim 25, wherein the comparing of the feedback signal and the target signal applied to the motor to calculate the phase error comprises marking the measured phase difference with a sign according to whether the phase error corresponds to Lag or Lead to calculate position error.

27. The motor control method according to claim 22, wherein the comparing of the feedback signal and the target signal applied to the motor to calculate the position error comprises:
counting rising edges or falling edges of the target signal and feedback signal to measure the position count of the target signal and a position count of the feedback signal; and
calculating position count error from a difference between the position count of the target signal and the position count of the feedback signal.

28. The motor control method according to claim 27, wherein the comparing of the feedback signal and the target signal applied to the motor to calculate the position error comprises:
starting calculation at a falling edge of the target signal when the position count is measured at a rising edge of the feedback signal or target signal; and
starting calculation at a rising edge of the target signal when the position count is measured at a falling edge of the feedback signal or target signal.

29. The motor control method according to claim 22, wherein the calculating of the control value for compensating for the position error and the calculating of the control value for compensating for the speed error and the phase error comprise:
performing calculating according to proportional integral differential (PID) control.

30. The motor control method according to claim 21, wherein the reference time corresponds to the number of pulses of the reference clock signal, counted for one period of the target signal.

31. A motor control method comprising:
acquiring a feedback signal containing rotation information of a motor installed in an image forming apparatus;
comparing the feedback signal and a target signal applied to the motor;
calculating a position control value for compensating for the position error based on the comparison of the feedback signal and the target signal applied to the motor which includes calculating position error of the motor by multiplying the position count error, which is determined by the comparison of the feedback signal and the target signal, by a reference time;
determining a control time at which a control of the motor is performed;
calculating a speed control value for compensating for the speed error based on the comparison of the feedback signal and the target signal applied to the motor;
calculating a phase control value for compensating for the phase error based on the comparison of the feedback signal and the target signal applied to the motor;
calculating a total control value by summing the position control value, the speed control value, and the phase control value; and
controlling the motor according to the total control value at least at the determined control time,
wherein the determined control time is at a falling edge of the target signal, if a position count is measured at a rising edge of the target signal, and the determined control time is at a next rising edge of the target signal, if the position count is measured at the falling edge of the target signal.

32. A motor control method comprising:
acquiring a feedback signal containing rotation information of a motor installed in an image forming apparatus;
comparing the feedback signal and a target signal applied to the motor;
calculating a position control value for compensating for the position error based on the comparison of the feedback signal and a target signal applied to the motor which includes calculating position error of the motor by multiplying the position count error, which is determined by the comparison of the feedback signal and the target signal, by a reference time;
determining a control time at which a control of the motor is performed;
calculating a speed control value for compensating for the speed error based on the comparison of the feedback signal and the target signal applied to the motor;
calculating a phase/position control value for compensating for phase/position error obtained by combining the phase error and the position error based on the comparison of the feedback signal and the target signal applied to the motor;
calculating a total control value by summing the position control value, the speed control value, and the phase/position control value; and
controlling the motor according to the total control value at least at the determined control time,
wherein the determined control time is at a falling edge of the target signal, if a position count is measured at a rising edge of the target signal, and the determined control time is at a next rising edge of the target signal, if the position count is measured at the falling edge of the target signal.

33. A motor control apparatus for controlling a motor installed in an image forming apparatus, the motor control apparatus comprising:
a detector configured to detect rotation of the motor to output a feedback signal; and
a calculator configured to determine a control time at which a control of the motor is performed, to calculate position error of the motor using a target signal and the feedback signal, and to calculate a control value for compensating for the position error,
wherein the calculator calculates position count error from a difference between the position count of the target signal and the position count of the feedback signal, and calculates position error of the motor by multiplying the position count error by a reference time, and
wherein the determined control time is at a falling edge of the target signal, if the position count is measured at a rising edge of the target signal, and the determined control time is at a next rising edge of the target signal, if the position count is measured at the falling edge of the target signal.

34. An image forming apparatus comprising:
a motor installed in the image forming apparatus;
a detector configured to detect rotation of the motor to output a feedback signal; and
a calculator configured to determine a control time at which a control of the motor is performed, to calculate position error using a target signal and the feedback signal, and to calculate a control value for compensating for the position error,
wherein the calculator calculates position count error from a difference between a measured position count of the target signal and a measured position count of the feedback signal, and calculates position error of the motor by multiplying the position count error by a reference time, and
wherein the determined control time is at a falling edge of the target signal, if the position count is measured at a rising edge of the target signal, and the determined control time is at a next rising edge of the target signal, if the position count is measured at the falling edge of the target signal.

* * * * *